July 15, 1969     T. HORNAK     3,456,189

SYNCHRONIZED RANDOM SAMPLING OSCILLOSCOPE

Filed Dec. 17, 1965     3 Sheets-Sheet 1

INVENTOR:
Tomás HORNAK
BY: Arthur O. Klein
his Attorney

July 15, 1969   T. HORNAK   3,456,189
SYNCHRONIZED RANDOM SAMPLING OSCILLOSCOPE
Filed Dec. 17, 1965   3 Sheets-Sheet 2

INVENTOR.
Tomas HORNAK
BY Arthur O. Klein
his Attorney

July 15, 1969

T. HORNAK 3,456,189

SYNCHRONIZED RANDOM SAMPLING OSCILLOSCOPE

Filed Dec. 17, 1965

INVENTOR:
Tomas HORNAK
BY: Arthur O. Klein
his Attorney

United States Patent Office 3,456,189
Patented July 15, 1969

3,456,189
SYNCHRONIZED RANDOM SAMPLING OSCILLOSCOPE
Tomáš Horňák, Prague, Czechoslovakia, assignor to Vyzkumny ustav matematickych stroju, Prague, Czechoslovakia
Filed Dec. 17, 1965, Ser. No. 514,515
Claims priority, application Czechoslovakia, Dec. 23, 1964, 7,308/64
Int. Cl. G01r 13/20, 23/16, 27/02
U.S. Cl. 324—121   8 Claims

ABSTRACT OF THE DISCLOSURE

A sampling oscilloscope is provided with facilities for sampling each successive rendition of a repetitive waveform at random times. Each sample is displayed on a region of the oscilloscope time scale whose location is proportional to the elapsed time between each random instant of sampling and the preceding one of a sequence of evenly spaced timing pulses occurring at the waveform repetition rate. Synchronization of the time base and the sampling intervals concentrates all of the samples in any desired portion of the waveform selected for display despite the random nature of the sampling.

---

This invention relates to cathode ray oscilloscopes and, more particularly, to oscilloscopic sampling arrangements for analyzing recurrent AC waveforms.

The use of amplitude-sampling techniques in a cathode ray oscilloscope permits the examination of recurrent waveforms having frequency components too high to be handled in normal oscilloscopic amplitude and time channels. For example, in the so-called equivalent time sampling technique, a discrete succession of voltage pulses are applied to the horizontal plates of an oscilloscope at a rate synchronized with the recurrence rate of the AC signal. The successive voltage pulses manifest uniformly increasing amplitudes over a second recurrent interval long with repect to a period of the AC signal so that the light spot moves point by point across the screen of the oscilloscope in a uniform manner. The successive amplitude samples of the AC signal, which are applied to the vertical plates, are progressively retarded in phase with respect to the start of the AC signal cycle. The resultant two-dimensional trace of the spot across the screen is a succession of dots whose envelope defines an expanded version of a selectable portion of the AC signal waveform.

This technique effectively modifies the time base of the oscilloscope by a factor equal to the ratio of the recurrent second interval (which is assumed to correspond to the horizontal width of the screen) to the actual time width occupied by the selected portion of the AC signal waveform. Moreover, since all of the sampling pulses available in each recurrent second interval are concentrated into the desired portion of the AC signal waveform, the resolution of the successive dots on the screen into a detailed, readily analyzable envelope is facilitated.

The above sampling technique has several disadvantages. For example, a large number of cycles (usually at least 100) of the AC signal are required in the recurrent second interval to produce a serviceable display. Thus, if the repetition frequency of the AC signal to be examined is relatively small (such as is the case with waveforms produced by many types of electromechanical devices), the light spot advances point-by-point across the screen at a very low rate. In order for such a slowly developing envelope to be intelligible, in its entirely, to the human eye, the screen must have an extremely long persistence and usually has to be observed in darkness. Moreover, the supply voltage for the horizontal and/or vertical plates may fluctuate during such a slow advance of the trace across the screen. In such a case, the slowly developing envelope may represent a distorted version of the selected portion of the AC waveform.

In an attempt to more quickly develop at least the broad outlines of the sampled waveform envelope, and thus to minimize the above disadvantages, a modified sampling technique known as real time or random sampling has been evolved. This technique is described, e.g., in Frye, G. and Nahman, N. S., "Random Sampling Oscillography," IEEE Transactions on Instrumentation and Measurement, March 1964, pp. 8–13. In this arrangement, the sampling pulses are not synchronized with the AC signal waveform, and the display rate of the amplitude samples is determined by the random times of collision between the sampling pulses and the AC signal. The amplitude samples of the AC signal are extracted at random time phases with respect to the start of each AC cycle rather than at successively delayed phases. The time position of each random amplitude sample is proportional to the time occurring between the start of a given cycle of the AC signal and the time of collision between the AC signal and the corresponding sampling pulse. Thus, successive points on the screen are spaced at random intervals in either direction rather than at discreet intervals in a fixed direction. Since any particular amplitude sample is statistically likely to occur anywhere along the width of the trace, the broad outlines of the complete trace may be relatively quickly ascertained by making use of the interpolating capability of the human eye. As a result, a screen of smaller persistence may be used. Also, the increase in the speed of development of the trace tends to minimize the effects of relatively slow fluctuations of the deflection plate supply voltages. However, because the sampling pulses and the AC signal are unsynchronized, they may be so phased as to infrequently collide with each other. Thus the display rate of the AC signal amplitude samples may be very low, particularly if, as in the usual case, only a fraction of the AC signal waveform is to be displayed across the screen for purposes of analysis. For example, where the portion to be displayed is one percent of the cycle, the trace presented on the screen with the use of real time sampling will also appear for only about one percent of the time corresponding to the width of the screen so that the definition of the picture will be very poor. Moreover, since it is statistically highly improbable that collision of sampling pulses and the AC signal will occur only within a desired portion of the AC signal waveform, adjustment of the effective time base of the oscilloscope is not feasible.

One object of the invention, therefore, is to provide new and improved oscilloscopic sampling arrangements for analyzing recurrent AC waveforms.

Another object of the invention is to provide, in a cathode ray oscilloscope, an adjustable time base sampling arrangement that yields a high-definition display trace discernible by the human eye on a screen of reduced persistence.

A further object of the invention is to provide in a cathode ray oscilloscope, an adjustable time base sampling arrangement that yields a display trace having reduced susceptibility to fluctuations in the supply voltage for the horizontal and/or vertical plates of the oscilloscope.

These and related objects are attained with oscilloscopic arrangements in accordance with the instant invention, which employ gating means for amplitude-sampling an incoming recurrent AC signal at selectable intervals and for applying the samples to the vertical plates. Means are provided for generating a succession of narrow pulses of random amplitude at a rate synchronized with the rate of recurrence of the AC signal.

The succession of random amplitude pulses are applied to the horizontal plates of the oscilloscope. The successive sampling intervals of the gating means are varied in accordance with the amplitude of successive pulses at the output of the generating means so that the amplitude sampling takes place at the rate of generation of the random pulses, i.e., the rate of the recurrent AC signal.

With this arrangement, the "collision" rate of the sampling pulses and the AC signal is predetermined and the display on the screen is formed at substantially the rate of recurrence of the AC signal. Also, the portion of the AC waveform in which the sampling pulses are concentrated may be adjusted to any desired width and relative time position by appropriately adjusting the amplitude range of the random amplitude pulses from the generating means. At the same time, the random amplitude nature of the successive sampling pulses, and of the corresponding pulses applied to the horizontal plates, distributes the successive points on the trace in correspondingly random locations along the width of the tube. This leads to a relatively rapid formation of the outline of the desired waveform portion so that the interpolating capability of the eye may be exploited to reduce the persistence of the tube. The relatively rapid formation of the desired waveform portion also minimizes the sensitivity of the resulting trace to variations in deflection plate supply voltage.

In a preferred embodiment of the invention, the random pulses are generated by applying the output of a free-running sawtooth oscillator to the base electrode of an emitter follower through a normally disabled diode bridge. The diode bridge is momentarily made conductive at a rate determined by the recurrence frequency of the AC signal for charging a capacitor in the base circuit of the emitter follower to the instantaneous voltage at the output of the saw tooth generator, which voltage is stored by the capacitor between enabling intervals of the diode bridge. The emitter follower outpulses the previously stored oscillator voltage to the horizontal plates each time the diode bridge is made conductive. The incoming AC signal is sampled whenever an amplitude coincidence takes place between the outpulsed oscillator voltage and the linearly increasing output voltage of an auxiliary sawtooth generator, which is triggered at the recurrence rate of the AC signal. An attenuator and a DC shift voltage generator are provided for separately and uniformly varying the relative and absolute amplitudes of the outpulsed oscillator samples to respectively adjust the width and time phase position of the amplitude samples to correspond to the desired portion of the AC waveform.

The nature of the present invention and its various advantages and features are set forth more fully in the following detailed description taken in connection with the appended drawing, in which.

Figure 1:
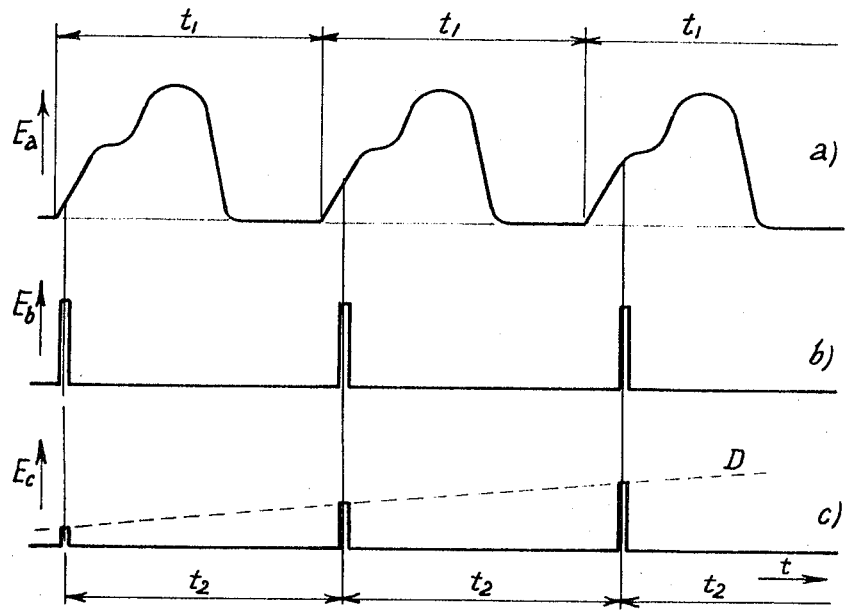
FIG. 1A illustrates in diagrammatic form a typical recurrent AC signal waveform at the input of a cathode ray oscilloscope.
FIG. 1B illustrates in diagrammatic form a succession of fixed amplitude pulses suitable for sampling the waveform of FIG. 1A, the pulses being passed in accordance with the principles of prior-art equivalent time sampling arrangements.
FIG. 1C illustrates in diagrammatic form the waveform obtained by forming the instantaneous product of the waveforms of FIG. 1A and 1B.

Referring in more detail to the drawing, FIG. 1A shows a recurrent AC waveform $E_a$ of a type that may be advantageously analyzed by oscilloscopic sampling techniques. The waveform $E_a$ has a period $t_1$. FIG. 1B shows a succession of constant amplitude, narrow-width sampling pulses $E_b$ of the type produced by a typical prior-art equivalent time sampling arrangement, such as that described below in connection with FIG. 2. The pulses $E_b$ sample as instantaneous amplitude in each successive cycle of the waveform $E_a$. The sampling pulses $E_b$ are successively retarded in phase in a uniform manner with respect to the start of each cycle of the waveform $E_a$ such that successively later points in the cycle of $E_a$ are sampled by successive sampling pulses $E_b$. Thus, the recurrence period $t_2$ of the pulses $E_b$ is synchronized with the rate of recurrence $t_1$ of the waveform $E_a$. The waveforms $E_a$ and $E_b$ are multiplied point by point (e.g., in the first gating circuit 104 of FIG. 2) to form the sampled waveform $E_c$ of FIG. 1C. The envelope D defined by the successive pulses $E_c$ is a greatly expanded version of the waveform $E_a$.

Figure 2:
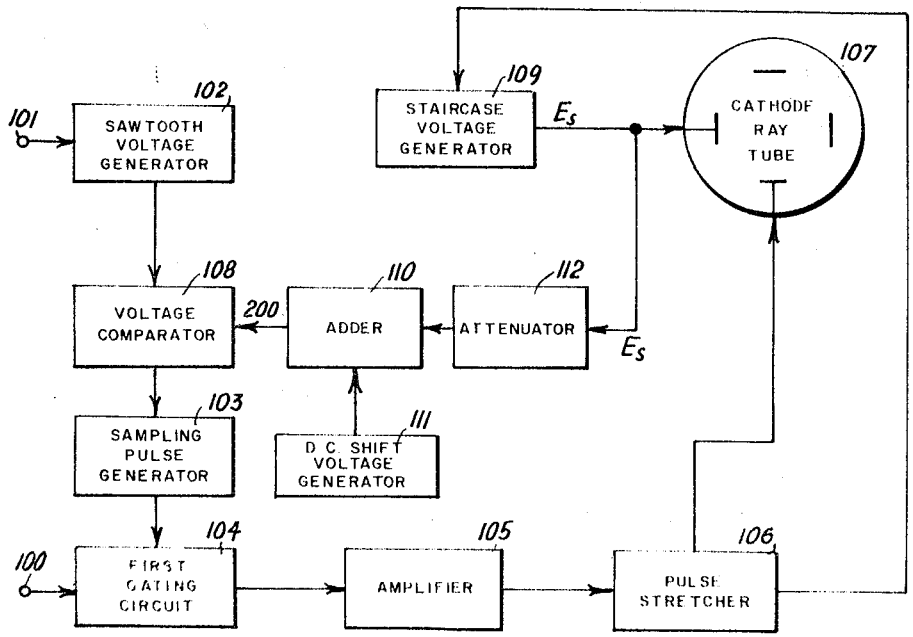
FIG. 2 is a block diagram of a prior-art equivalent time sampling arrangement for a cathode ray oscilloscope.

FIG. 2 shows a block diagram of a typical oscilloscopic sampling arrangement for examining the waveform of FIG. 1A with sampling pulses of the type shown in FIG. 1B. The waveform $E_a$ is applied to one input 100 of the oscilloscope. A trigger pulse, which recurs at the rate of the waveform $E_a$ and may be directly derived therefrom, is applied to another input 101. The above-mentioned trigger pulse activates a sawtooth generator 102 which supplies a recurrent, linearly increasing voltage to one input of a voltage comparator 108 during each cycle of the waveform $E_a$. Another input of the comparator 108 is supplied with a reference voltage (to be described below) over a lead 200 at a rate synchronized with the recurrence rate of the waveform $E_a$. A pulse is applied from the comparator 108 to a sampling pulse generator 103 upon each coincidence of the output voltage of the sawtooth generator 102 and the reference voltage supplied over the lead 200. The output of the pulse generator 103, which is synchronized with the pulses applied thereto from the comparator 108, is a succession of constant amplitude sampling pulses occurring every cycle of the waveform $E_a$ and spaced apart by a time (e.g., $t_2$ in FIG. 1B) determined by the interval between successive amplitude coincidences in the comparator 108.

The recurrent waveform $E_a$ at the input 100 is applied to a first gating circuit 104, which is enabled at successively later points during each cycle of the waveform $E_a$ by the sampling pulses at the output of pulse generator 103. The amplitude samples $E_c$ (FIG. 1C) at the output of the first gating circuit 104 are amplified in a wide band amplifier 105 and are then applied to a pulse stretcher 106, which may increase the pulse width of the successive amplitude samples $E_c$ to a value slightly less than the recurrence period of the waveform $E_a$. The so-conditioned amplitude samples $E_c$ are coupled through one output of the pulse stretcher 106 to the vertical deflection plates of a cathode ray tube 107.

Figure 3:
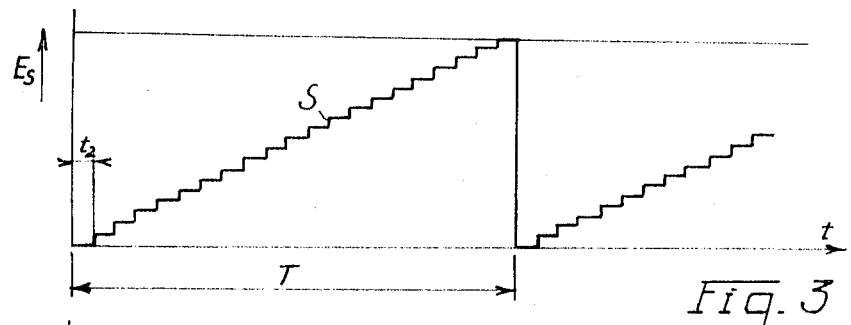
FIG. 3 illustrates in diagrammatic form the output waveform of a typical time base generator employed in the sampling arrangement of FIG. 2.

The horizontal deflection plates of the tube 107 are coupled to the output of a time base generator 109 which produces an increasing voltage over a second recurrence period T that is large (preferably at least 100 times as large) as the period $t_1$ of the waveform $E_a$. The generator 109 is synchronized with the pulse stretcher 106 so that the output voltage of the generator 109 is applied to the horizontal plates as a succession of pulses of increasing amplitude at a rate synchronized with the recurrence rate of the signal $E_a$. The resulting output voltage $E_s$ is assumed to take the form of a staircase waveform shown in FIG. 3, so that the light spot on the screen remains essentially stationary between the successive steps S of increasing amplitude to improve the resolution of the trace. The successively increasing voltage $E_s$ advances the light spot from left to right across the screen at uniform discrete intervals.

The output of the staircase voltage generator 109 is also coupled to one input of an adding circuit 110 through an attenuator 112, the setting of which varies the maximum-to-minimum amplitude range of the voltage $E_s$ applied thereto. The voltage increment between successive steps S (FIG. 3) is correspondingly varied. A DC shift voltage generator 111 is coupled to the other input of the adding circuit 110 for varying the DC level of the waveform $E_s$ to shift the absolute magnitudes of the steps S without changing the increments between them.

The output of the adding circuit 110 is applied over the lead 200 to the other input of the comparator 108 and serves as the above-mentioned reference voltage. Since the characteristics of the voltage at the output of sawtooth generator 102 remain constant from cycle to cycle of the waveform $E_a$, the setting of the amplitude range of the voltage $E_s$ by the attenuator 112 and the DC shifting voltage generator 111 determines the amplitude variation of the voltage $E_s$ during successive cycles of $E_a$ and thus the variation in the successive times of amplitude coincidence in the comparator 108. The intervals between the successive sampling pulses at the output of the pulse generator 103 are therefore selectable through the adjustments of the attenuator 112 and the DC shifting voltage generator 111. Because the increments between successive steps S (FIG. 3) of the voltage $E_s$ will remain uniform irrespective of their absolute magnitudes as determined by the last-mentioned adjustments, each of the successive steps of the waveform $E_s$ will coincide with the linearly increasing voltage at the output of the sawtooth generator 102 at a correspondingly later time during successive cycles of the waveform $E_a$. Thus, the successive sampling pulses $E_b$ applied to the enabling input of the first gating circuit 104 will be successively delayed with respect to the start of each cycle of the waveform $E_a$, as indicated above in connection with FIGS. 1A–1C.

The visually discernible effect of varying the setting of the attenuator 112 is to determine the width of the portion of the waveform $E_a$ to be displayed on the screen over the recurrent interval T established by the generator 109. The effect of varying the setting of the DC shift voltage generator 111 is to determine the time position of the portion to be displayed with respect to the start of the cycle of the waveform $E_a$.

As indicated above, the use of the prior art sampling arrangements shown in FIGS. 1 and 2 causes the display trace to advance relatively slowly from left to right across the screen. Thus, in certain cases, the normal interpolating capability of the eye cannot be effectively employed to discern the overall trace, and the tube 107 must therefore have a very high persistence when the trace is to be visually examined. Also, the relatively slow advancement of the spot across the screen may render the trace susceptible to inaccuracies because of variations in the supply voltages applied to the respective pairs of deflection plates of the tube 107.

Figure 4:
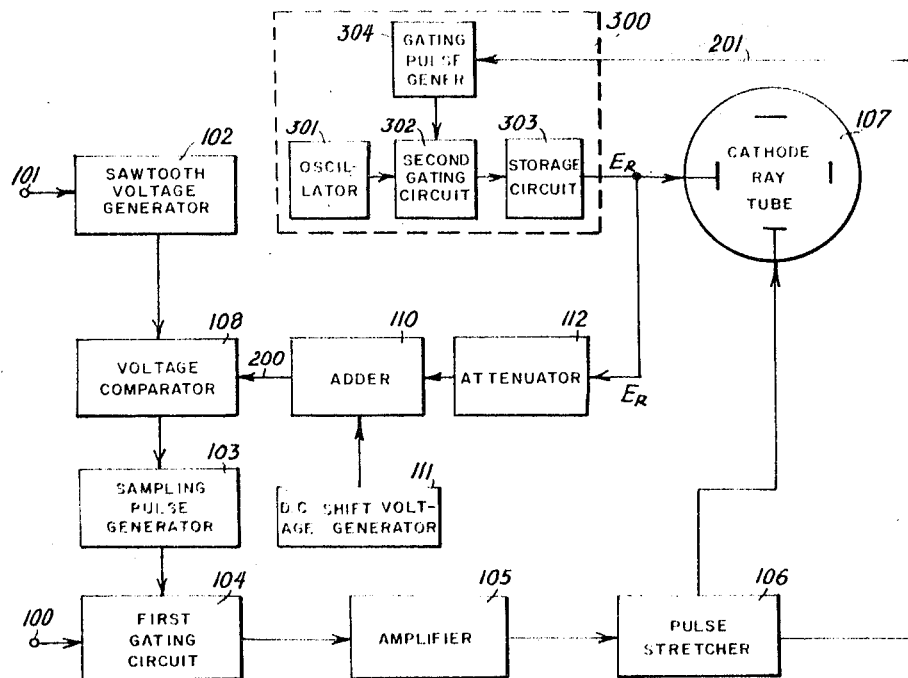
FIG. 4 is a block diagram of an oscillascopic sampling arrangement in accordance with the principles of the present invention.

In accordance with the invention, these disadvantages are overcome with the sampling arrangement shown in FIG. 4, in which the staircase generator 109 of FIG. 2 is replaced by a random amplitude pulse generator 300. Like components in the arrangements of FIG. 2 and 4 have been given like reference designations.

Figure 5:
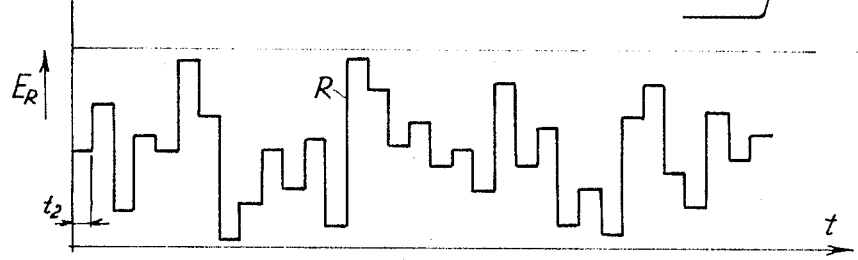
FIG. 5 illustrates in diagrammatic form the output waveform of a time base generator employed in the sampling arrangement of FIG. 4.

The generator 300, like the generator 109 of FIG. 2, is triggered by the pulse stretcher 106 at a rate synchronized with the rate of recurrence of the waveform $E_a$ over a lead 201 from the pulse stretcher 106. As a result, the horizontal plates of the tube 107 are supplied with voltage pulses $E_r$ at a rate essentially corresponding to the recurrence rate of the AC signal $E_a$. Unlike the scheme of FIG. 2, however, the amplitudes of successive output voltage pulses of the generator 300 are entirely random and may have the waveform illustrated in FIG. 5.

Referring again to FIG. 4, the generator 300 includes an oscillator 301 that is free-running and is therefore unsynchronized with the waveform $E_a$ applied to the terminal 100. The output of the oscillator 301 is applied, through a second gating circuit 302, to a storage circuit 303 that is assumed to be capable of storing a succession of momentary input pulses of arbitrary amplitude applied to its input and of outpulsing each stored input upon the application thereto of the next succeeding momentary pulse. The second gating circuit 302 is enabled by an output pulse from a gating pulse generator 304 which, in turn, is triggered at a rate synchronized with that of the waveform $E_a$ over the lead 201. Successive oscillator output samples $E_r$ are outpulsed from the storage circuit 303 to the horizontal plates of the tube 107.

The voltage $E_r$ is also applied to the adding circuit 110 through the attenuator 112 in a manner similar to that described with respect to the voltage $E_s$ of FIG. 2. With the arrangement of FIG. 4, however, the reference voltage applied to the second input of the voltage comparator 108 from the adding circuit 110 will not consist of successively increasing amplitude steps but will vary randomly (at intervals of the waveform $E_a$) between amplitude limits set by the attenuator 112 and the DC shift voltage generator 111. As a result, the time of amplitude coincidence between the reference voltage and the output of the sawtooth generator 102 will vary randomly from cycle to cycle so that the successive intervals of the sampling pulses applied to the enabling input of the first gating circuit 104 will be correspondingly random. Nevertheless, the total phase dispersion of the sampling pulses, and thus the portion of the waveform $E_a$ into which the sampling pulses are concentrated, is directly controlled by the attenuator 112. Moreover, the relative portion of the cycle of the AC signal $E_a$ over which the dispersion set by the attenuator 112 will be effective is directly controlled by the DC shift voltage generator 111. Since a "collision" between a sampling pulse and the waveform $E_a$ is assured during each cycle of the latter, all of the available sampling pulses may be concentrated into any desired fraction of the waveform $E_a$. At the same time, the random positioning of successive points of the trace on the screen at a fixed rate of occurrence permits full utilization of the interpolation powers of the eye so that a reduced persistence screen may be employed. Also, the relatively rapid development of an entire trace on the screen minimizes the sensitivity thereof to fluctuations in the deflection plate supply voltages.

Figure 6:
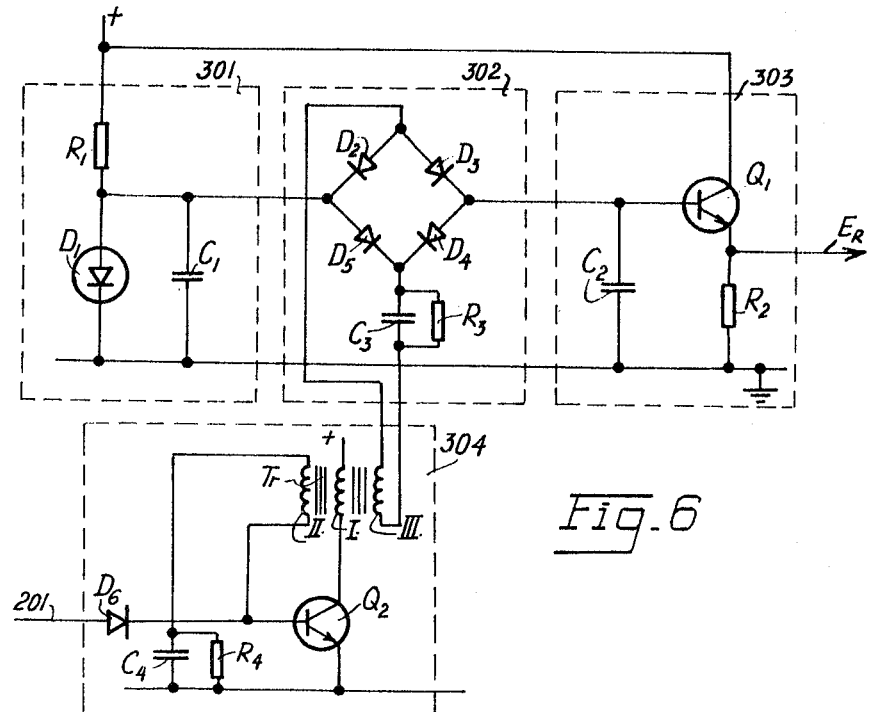
FIG. 6 is a schematic diagram of a practical form of time base generator designed to yield the waveform of FIG. 5.

FIG. 6 illustrates a schematic diagram of a preferred arrangement for the random amplitude pulse generator 300. A free-running sawtooth generator, which includes a resistor $R_1$ and a capacitor $C_1$ serially connected between a source of positive DC voltage and a reference ground, forms the oscillator 301. The capacitor $C_1$ is shunted by a PNPN diode schematically shown as $D_1$. The parameters $R_1$ and $C_1$ are selected to set the frequency of the oscillator 301 to any desired value, illustratively one megacycle per second. The output of the capacitor $C_1$ is applied through the second gating circuit 302 to the base terminal of a transistor $Q_1$. The transistor $Q_1$ is connected in an emitter-follower configuration which forms the storage circuit 303. The emitter-collector path of the transistor $Q_1$ is interposed between the positive DC voltage source and a grounded emitter resistor $R_2$ across which the successive samples of the output voltage $E_r$ of the generator 300 are taken. A capacitor $C_2$, smaller than the capacitor $C_1$, is connected between the base electrode of the transistor $Q_1$ and ground.

The second gating circuit 302 is shown as a diode bridge that includes two parallel paths connected in series between the ungrounded output terminal of the oscillator 301 and the base terminal of the transistor $Q_1$. One path includes a first pair of diodes D2 and D3 connected in series-opposing relation, and the other path includes a second pair of diodes D4 and D5 connected in series-opposing relation in the opposite sense. In the configuration shown, the diode bridge is normally non-conducting so that the output of the oscillator 301 is correspondingly isolated from the emitter follower.

The output of the pulse stretcher 106 is applied through a diode $D_6$ to the base of a transistor $Q_2$ in the gating pulse generator 304. The emitter-collector path of the transistor $Q_2$ is interposed between the positive DC source and ground through a primary winding I of a plate transformer $T_r$. A first secondary winding II of the plate transformer $T_r$ is fed back to the base-emitter path of the transistor $Q_2$ through a resistor $R_4$ and a capacitor $C_4$ connected in shunt, thereby forming a monostable blocking oscillator. The output of the gating pulse generator 304 is taken across a second secondary winding III of the plate transformer $T_r$, and is applied between the junction of the diodes D2 and D3 and the junction of the diodes D4 and D5 through a capacitor $C_3$ by-passed with a resistor $R_3$.

Each pulse applied from the pulse stretcher 106 to the blocking oscillator causes the diode bridge to momentarily conduct at a rate synchronized with the recurrence rate of the waveform $E_a$ to be examined. The output of the oscillator 301 is coupled to the emitter follower during the conduction interval of the diode bridge so that the capacitor $C_2$ charges to a voltage equal to the output voltage of the oscillator 301. The resulting voltage across the capacitor $C_2$ is stored until the occurrence of the next pulse from the pulse stretcher 106 to the blocking oscillator, since the diode bridge prevents the discharge of the capacitor $C_2$ when the former is non-conducting.

Figure 7:
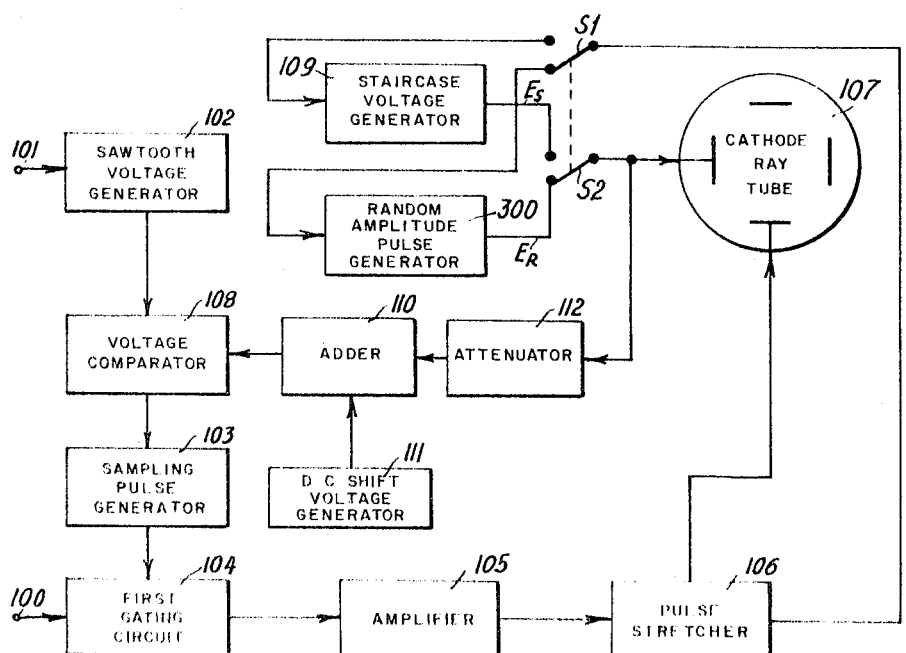
FIG. 7 is a block diagram of an oscilloscopic sampling arrangement which selectively incorporates the features of the arrangements of FIGS. 2 and 4.

FIG. 7 shows a block diagram of an oscilloscopic sampling arrangement adapted to selectively employ the staircase voltage generator 109 (FIG. 2) and the random amplitude voltage generator 300 (FIG. 4) as the time base generator for the tube 107. This embodiment is valuable in situations where an external recorder (not shown) is available and where it is consequently not necessary to take advantage of the interpolation facility of the human eye at all times. A double pole-double throw switch S1, S2 is employed for connecting a selected one of the generators 109 and 300 between the auxiliary output of the pulse stretcher 106 and the horizontal plates of the cathode ray tube 107. Thus, where analysis of the waveform $E_a$ is to be made with the unaided eye, the advantages provided by the generator 300 are paramount and the switches S1 and S2 are set in the lower position shown in FIG. 7. Where, on the other hand, the analysis of the waveform $E_a$ is to be made with the use of a typical recorder whose operating characteristics are not compatible with the random nature of the trace development in accordance with the present invention, the generator 109 should be employed and the switches S1 and S2 are placed in the upper position shown in FIG. 7. The remainder of the circuitry shown in FIG. 7 is identical to that described in connection with FIG. 4.

What is claimed is:
1. In a cathode ray sampling oscilloscope for analyzing a cyclically recurrent, jitter-free waveform:
first and second cooperative pairs of deflection plates;
first gating means responsive to a succession of evenly spaced timing pulses occurring at the waveform recurrence rate for sampling each rendition of the waveform at an instant spaced in time by a selectable first interval from the occurrence of a corresponding one of the timing pulses;
first means for generating a succession of control pulses of random amplitude at a sampling rate synchronized with the waveform recurrence rate;
means coupled to the first gating means for applying the waveform samples to the first pair of deflection plates;
means for directly applying the successive control pulses to the second pair of deflection plates so that the instantaneous ray deflection between the second plates is proportional to the amplitude of the associated control pulse; and
means responsive to each control pulse for individually varying the length of the first sampling interval in proportion to the corresponding deflection of the second plates.

2. In a cathode ray sampling oscilloscope for analyzing a cyclically recurrent, jitter-free waveform:
first and second cooperative pairs of deflection plates;
first gating means responsive to a succession of evenly spaced timing pulses occurring at the waveform recurrence rate for sampling each rendition of the waveform at an instant spaced in time by a selectable first interval from the occurrence of a corresponding one of the timing pulses;
means coupled to the first gating means for applying the waveform samples to the first deflection plates;
first means for generating a succession of first control pulses of random amplitude at a rate synchronized with the waveform recurrence rate;
second means for generating a repetitive succession of second control pulses of increasing amplitude at a rate synchronized with the waveform recurrence rate, each succession of second pulses having a period that is large with respect to the period corresponding to the waveform recurrence rate;
switching means for connecting the output of a selected one of the first and second generating means to the second deflection plates so that the instantaneous ray deflection between the second plates is proportional to the amplitude of the associated control pulse; and
means driven by the selected one of the first and second generating means for individually varying the length of the first sampling interval in proportion to the corresponding deflection of the second plates.

3. In a cathode ray oscilloscope as defined in claim 1, said first generating means comprising
a free running oscillator;
means for storing a successive of momentary random-amplitude signals and for outpulsing each of said momentary signals to said second pair of plates upon storing the next succeeding momentary signal; and
second gating means enabled at the waveform recurrence rate for momentarily applying the output of said oscillator to said storing means.

4. In a cathode ray oscilloscope as defined in claim 1, said varying means comprising
second means triggered at the recurrence rate of said waveform for generating an auxiliary signal that increases substantially linearly with time; and
comparison means coupled to said first and second generating means for indicating each amplitude coincide of said auxiliary signal and said random amplitude pulses, said first gating means being momentarily enabled upon each amplitude coincidence in said comparison means.

5. In a cathode ray oscilloscope as defined in claim 4, said oscilloscope further including means for adjusting the amplitude range of said random amplitude pulses to vary the time of said amplitude coincidence in said comparison means.

6. In a cathode ray oscilloscope as defined in claim 5, said adjusting means comprising first means for altering the relative amplitudes of the random amplitude pulses to establish a desired phase dispersion of the amplitude samples at the output of said first gating means; and second means for altering the absolute amplitudes of the random amplitude pulses to vary the time phase of the amplitude samples with respect to a reference phase of said waveform.

7. In a cathode ray oscilloscope as defined in claim 6, said oscilloscope further comprising an adder, said first altering means including an attenuator coupled to one input of said adder, said second altering means including a DC shift voltage generator coupled to the other input of said adder, said comparison means being coupled to the output of said adder.

8. A cathode ray sampling oscilloscope as defined in claim 1, in which said first generating means comprises, in combination, a free-running sawtooth generator;

an emitter follower; a normally non-conducting bridge cricuit having first and second pairs of diodes respectively connected in series-opposing relation in respectively opposite senses between the output terminal of said sawtooth generator and a base electrode of said emitter follower; a monostable blocking oscillator triggered at said waveform recurrence rate by said conditioning means, the output of said blocking oscillator being coupled between the junctions of the serially connected diodes in said first and second pairs for momentarily causing conduction of said bridge circuit at said recurrence rate; and means connected in the base circuit of said emitter follower for receiving the output of said sawtooth generator when said bridge circuit is conducting and for storing said last-mentioned output when said bridge circuit is non-conducting.

References Cited

UNITED STATES PATENTS

| 3,010,071 | 11/1961 | Carlson | 328—186 |
| 3,069,559 | 12/1962 | Chaplin et al. | 328—186 XR |
| 3,229,212 | 1/1966 | Rogers | 328—186 XR |
| 3,244,989 | 4/1966 | Carlson | 328—186 XR |
| 3,248,655 | 4/1966 | Kobbe et al. | 328—186 XR |

OTHER REFERENCES

McQueen, J. G.: Electronic Engineering, October 1952, pp. 436 to 441.

Frye et al.: IEEE Transactions on Instrumentation and Measurement, March 1964.

RUDOLPH V. ROLINEC, Primary Examiner

ERNEST F. KARLSEN, Assistant Examiner

U.S. Cl. X.R.

324—77; 328—150